A. L. RICHARDSON.
CAMERA.
APPLICATION FILED SEPT. 11, 1908.
932,326.
Patented Aug. 24, 1909.
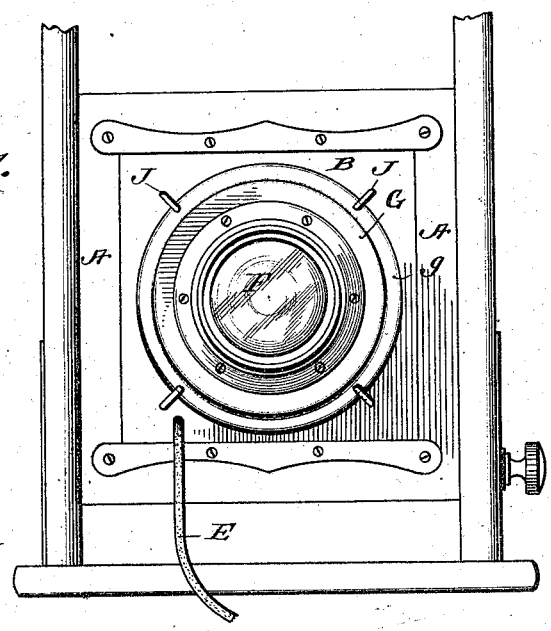
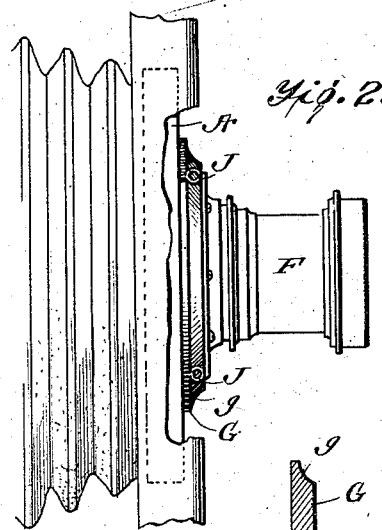
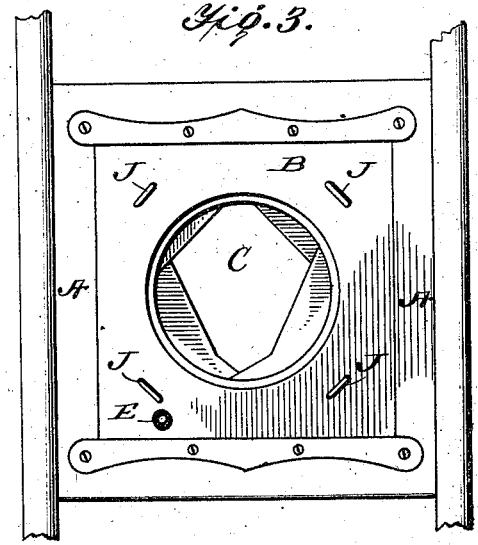
WITNESSES
L. H. Schmidt.
L. A. Stanley
INVENTOR
ARTHUR L. RICHARDSON,
BY Munn & Co.
ATTORNEYS

UNITED STATES PATENT OFFICE.

ARTHUR L. RICHARDSON, OF MELROSE, TERRITORY OF NEW MEXICO.

CAMERA.

932,326. Specification of Letters Patent. Patented Aug. 24, 1909.

Application filed September 11, 1908. Serial No. 452,657.

*To all whom it may concern:*

Be it known that I, ARTHUR L. RICHARDSON, a citizen of the United States, and a resident of Melrose, in the county of Roosevelt and Territory of New Mexico, have invented a certain new and useful Improvement in Cameras, of which the following is a specification.

This invention relates to improvements in photographic apparatus and is applicable chiefly to cameras used in photographic studios for the purpose of making portraits; also it may be used with other cameras such as those used for taking landscapes or for other outdoor photographs.

An object of my invention is to provide a convenient device which may be attached to the front board of a camera and in the use of which the inconvenience of the necessity of an individual front board for each different size of lens to be used, is obviated.

A further object of my invention is to provide a device, in the use of which, a single shutter of sufficient size to accommodate the largest sized lens may also be used for lenses of small size without necessitating the removal of the front board.

My invention is illustrated in the accompanying drawings in which—

Figure 1 is a front view of a camera with my invention applied thereto. Fig. 2 is a side view of Fig. 1, a portion of a camera structure being broken away; Fig. 3 is a view of the front board of the camera showing a shutter attached to its rear side. Fig. 4 is a central section through the lens-supporting plate.

In the use of the ordinary portrait camera in photographic galleries or studios, various sized lenses are required for the different purposes to which the camera is put. It is customary to provide the camera with a number of front boards each having on its front side a lens and on its rear side a shutter corresponding with the lens. When it is necessary to change one of the lenses the front board is removed and another one bearing the particular lens desired is substituted in its place. This necessitates the provision of a number of front boards for the camera as well as a number of shutters. As these shutters are expensive it will be seen that any device whereby one shutter can be made to answer for a number of different lenses will be of benefit to the photographer.

Referring now to the drawings A denotes in general a camera having the front board B removably secured to the front thereof, in the manner shown in the drawing. The front board B is provided with an opening C. On the rear side of the opening is a shutter D arranged to be operated by a pneumatic means consisting of the tube E and a bulb (not shown), in the usual manner. The shutter D is attached to the rear side of the front plate B and in the ordinary construction the lens F is mounted in the opening C in the front board of the camera.

Instead of mounting the lens in the opening of the front board B, I provide a circular disk or supporting plate G and mount the lens directly upon said supporting plate, in the opening H provided for the purpose. The circular plate G is beveled at its outer edge as shown at *g* and is arranged to lie flat against the forward side of the front plate B with its opening H registering with or centrally disposed in relation to the opening C. The size of the opening H in the supporting plate G depends of course on the size of the lens to be used.

In order to retain the supporting plate G in position as well as to center the same I have provided the screw-eyes J. When the supporting plate is placed next to the front plate the screw-eyes J are turned in the position indicated in Fig. 3. The screw-eyes are so located that they will just permit the supporting plate to enter between them and when they are turned into the position shown in Fig. 1, the edges of the eyes engage the pivoted surface *g* of the support thereby holding the latter together with its lenses securely upon the front plate. By making a number of these supporting plates and mounting lenses of various sizes in them I may use a single shutter, provided this shutter is large enough to accommodate the largest sized lens. In some forms of shutters the opening may be regulated and with this type of shutter the opening should be regulated according to the size of the lens used, but in most cases it will not be necessary since it is sufficient to provide a shutter opening sufficient to accommodate the lens of the largest diameter.

It will thus be seen that I have provided a device which is capable of permitting the attachment of lenses of different size without the removal of the front board or the necessity of using more than one shutter.

I am aware that other forms of the invention based upon the same general idea might be made but I consider as my own and wish to claim all such modifications as fairly fall within the spirit and the scope of the invention.

I claim—

In a camera, a box provided with a front plate, having an opening, a shutter carried by said front plate on the rear side thereof, a circular supporting plate provided with an opening adapted to register with the opening of said front plate, a lens mounted on said supporting plate and fastening devices carried by said front plate arranged to engage the outer edge of said supporting plate for centering and fastening the same.

ARTHUR L. RICHARDSON.

Witnesses:
G. N. HARSH,
C. M. CLINGMAN.